United States Patent
Shi et al.

(10) Patent No.: US 9,531,454 B2
(45) Date of Patent: Dec. 27, 2016

(54) CODEBOOK SUBSET RESTRICTION SIGNALING FOR MULTI-CARRIER MULTI-ANTENNA WIRELESS COMMUNICATION SYSTEM

(71) Applicant: TELEFONAKTIEBOLAGET L M ERICSSON (PUBL), Stockholm (SE)

(72) Inventors: Nianshan Shi, Järfälla (SE); Sairamesh Nammi, Kista (SE); Namir Lidian, Solna (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/707,239

(22) Filed: May 8, 2015

(65) Prior Publication Data
US 2016/0329937 A1   Nov. 10, 2016

(51) Int. Cl.
| | | |
|---|---|---|
| H04B 7/04 | (2006.01) | |
| H04W 16/18 | (2009.01) | |
| H04B 7/02 | (2006.01) | |
| H04B 7/06 | (2006.01) | |
| H04L 5/00 | (2006.01) | |
| H04W 88/02 | (2009.01) | |
| H04W 88/08 | (2009.01) | |

(52) U.S. Cl.
CPC ............ H04B 7/0417 (2013.01); H04B 7/024 (2013.01); H04B 7/0478 (2013.01); H04B 7/066 (2013.01); H04L 5/001 (2013.01); H04W 16/18 (2013.01); H04W 88/02 (2013.01); H04W 88/08 (2013.01)

(58) Field of Classification Search
CPC ....... H04B 7/0417; H04B 7/024; H04B 7/066; H04B 7/0478; H04W 16/18; H04W 88/02; H04W 88/08; H04L 5/001
See application file for complete search history.

(56) References Cited

U.S. PATENT DOCUMENTS

| | | | |
|---|---|---|---|
| 2009/0028264 A1* | 1/2009 | Zhang | H04L 1/0606 375/267 |
| 2009/0221290 A1* | 9/2009 | Kang | H04W 36/06 455/437 |
| 2011/0103243 A1* | 5/2011 | Larsson | H04L 5/001 370/252 |
| 2011/0268072 A1* | 11/2011 | Lee | H04B 7/068 370/329 |

(Continued)

OTHER PUBLICATIONS

Huawei; "Study on Downlink Enhancements for UMTS;" 3GPP TSG RAN Meeting #65, RP-141657, Edinburgh, Scotland, Sep. 9-12, 2014.

(Continued)

Primary Examiner — Sophia Vlahos

(57) ABSTRACT

A radio network node identifies a codebook subset restriction to be applied to a user equipment (UE) employing carrier aggregation and multiple-input-multiple-output (MIMO), identifies a correspondence between the codebook subset restriction and multiple carriers in a carrier group of the UE, and transmits correspondence information indicating the correspondence between the codebook subset restriction and the multiple carriers in the carrier group. The UE receives the correspondence information and transmits channel state information for the multiple carriers according to the codebook subset restriction.

27 Claims, 11 Drawing Sheets

(56) References Cited

U.S. PATENT DOCUMENTS

2012/0163236 A1* 6/2012 Kim ................. H04L 25/03942
370/254

OTHER PUBLICATIONS

3GPP TS 36.213 V 12.0.0; 3rd Generation Partnership Project; Technical Specification Group Radio Access Network; Evolved Universal Terrestrial Radio Access (E-UTRA); Physical layer procedures (Release 12) Dec. 2013.
3GPP TS 25.214 V12.2.0; 3rd Generation Partnership Project; Technical Specification Group Radio Access Network; Physical layer procedures (FDD)(Release 12); Mar. 2015.
3GPP TS 25.331 V12.3.0; 3rd Generation Partnership Project; Technical Specification Group Radio Access Network; Radio Resource Control (RRC); Protocol specification (Release 12); Oct. 2014; Sections 10.3.6.142 and 10.3.6.144.
Ericsson, et al: "Precoding weight set restriction setting for secondary cell," 3GPP draft; R2-106359; Nov. 7, 2010.
Huawei: "Delta signalling for CA," 3GPP draft; R2-103796; Jun. 22, 2010.
3GPP TS 36.331; 3rd Generation Partnership Project; Technical Specification Group Radio Access Network; Evolved Universal Terrestrial Radio Access (E-UTRA); Radio Resource Control (RRC); Protocol specification (Release 12); Mar. 27, 2015.

* cited by examiner

CODEBOOK SUBSET RESTRICTION SIGNALING FOR MULTI-CARRIER MULTI-ANTENNA WIRELESS COMMUNICATION SYSTEM

TECHNICAL FIELD

The disclosed subject matter relates generally to telecommunications, and more particularly to codebook subset restriction signaling for multi-carrier multi-antenna wireless communication systems.

BACKGROUND

A multi-antenna wireless communication system may use multiple antennas for transmission, reception, or both. This use of multiple antennas is generally intended to improve one or more aspects of system performance, such as spectral efficiency or signal quality, for example.

During transmission with multiple antennas, the same signal is usually emitted from each antenna with slightly different signal properties (e.g., different phase and gain), which may result in favorable patterns of constructive and/or destructive interference. The differences in signal properties can be controlled through the use of precoding, a technique that modifies the signal for each antenna based on a precoding matrix.

The precoding matrix is typically selected from among multiple candidate precoding matrices defined in a codebook. The selection of a particular precoding matrix is generally intended to achieve a desired level of performance, and can be based on any of several factors, such as current system configuration, communication environment, and feedback from an apparatus receiving the transmitted signal.

A common way to use feedback in selecting a precoding matrix is to define the same codebook at both a transmitting apparatus (e.g., a base station) and a receiving apparatus (e.g., a user equipment [UE]), and allow the receiving apparatus to "recommend" a precoding matrix from the codebook—e.g., by transmitting a precoding matrix index (PMI)—based on properties of received signals. For instance, if the receiving apparatus determines that a received signal has relatively low signal-to-noise ratio (SNR), it may recommend replacing a current precoding matrix with a new precoding matrix to increase the SNR.

Under certain circumstances, a system may limit the set of candidate precoding matrices that can be selected from the codebook. In other words, the system may prevent the receiving apparatus from selecting some precoding matrices while allowing it to select others. Such a restriction can be referred to as "codebook subset restriction" or "precoding weight set restriction", terms that may be used interchangeably in this description.

One way for a system to implement codebook subset restriction is to transmit a "codebook subset restriction bitmap" from a transmitting apparatus to a receiving apparatus. The codebook subset restriction bitmap typically comprises a bit corresponding to each precoding matrix in the codebook, where the value of each bit (e.g., "0" or "1") indicates to the receiving apparatus whether or not it is restricted from recommending a corresponding one of the precoding matrices.

A general drawback of codebook subset restriction is that it tends to increase signaling overhead. For instance, in some systems, the codebook subset restriction bitmap comprises 64 bits per channel, so a transmitting apparatus may be required to transmit a relatively large amount of information to implement codebook subset restriction for all of its channels. Such transmissions may be an inefficient use of available communication resources.

SUMMARY

In one embodiment of the disclosed subject matter, a method in a radio network node of a wireless communication system comprises identifying a codebook subset restriction to be applied to a UE employing carrier aggregation in multiple-input-multiple-output (MIMO) communication, identifying a correspondence between the codebook subset restriction and multiple carriers in a carrier group of the UE, and transmitting, from the radio network node to the UE, correspondence information indicating the correspondence between the codebook subset restriction and the multiple carriers in the carrier group.

In certain related embodiments, the method further comprises transmitting, from the radio network node to the UE, codebook subset restriction information indicating the codebook subset restriction. In some such embodiments, the codebook subset restriction information comprises a codebook subset restriction bitmap, and the correspondence information indicates that the codebook subset restriction bitmap applies to each of the multiple carriers in the carrier group.

In certain related embodiments, the correspondence information indicates that all carriers in the carrier group use the same codebook subset restriction.

In certain related embodiments, the correspondence information comprises first information associating the codebook subset restriction with one carrier in the carrier group, and second information indicating that at least one other carrier in the carrier group is to use the same codebook subset restriction as the one carrier. In some such embodiments, the one carrier is a primary carrier of the carrier group and the at least one other carrier is a non-primary carrier of the carrier group. In some other such embodiments, the second information comprises at least one multi-carrier codebook subset restriction confirmation bit.

In certain related embodiments, the correspondence information comprises at least one multi-carrier codebook subset restriction confirmation bit.

In certain related embodiments, the method further comprises determining whether all carriers of the carrier group reside in a single frequency band, and selectively applying the same codebook subset restriction to all or only some of the carriers according to the determination.

In certain related embodiments, the method further comprises identifying at least one additional codebook subset restriction to be applied to the UE, identifying an additional correspondence between the at least one additional codebook subset restriction and multiple other carriers in the carrier group, and transmitting, from the radio network node to the UE, additional correspondence information indicating the additional correspondence. In some such embodiments, the multiple carriers are disposed in one frequency band and the multiple other carriers are disposed in at least one other frequency band separate from the one frequency band. The correspondence information and the additional correspondence information typically each comprise at least one band-specific multi-carrier codebook subset restriction confirmation bit. The method may still further comprise receiving, from the UE, an indication of carrier/band combinations for the first and second frequency bands, and transmitting the correspondence information and the additional correspondence information in response to receiving the indication of the carrier/band combinations.

In certain related embodiments, the method further comprises transmitting, from the radio network node to the UE, nullification information to nullify a prior codebook subset restriction for one or more of the multiple carriers, wherein transmission of the correspondence information causes a new codebook subset restriction to be applied to the one or more of the multiple carriers.

In certain related embodiments, transmission of the correspondence information causes a current codebook subset restriction of the UE to be replaced by a new codebook subset restriction.

In another embodiment of the disclosed subject matter, a method in a wireless communication device employing carrier aggregation in MIMO communication comprises identifying a codebook subset restriction to be applied to multiple carriers in a carrier group of the wireless communication device, receiving, from a radio network node, correspondence information indicating a correspondence between the codebook subset restriction and the multiple carriers in the carrier group, and transmitting channel state information for the multiple carriers according to the codebook subset restriction.

In certain related embodiments, the method further comprises receiving, from the radio network node, codebook subset restriction information indicating the codebook subset restriction. In some such embodiments, the codebook subset restriction information comprises a codebook subset restriction bitmap, and the correspondence information indicates that the codebook subset restriction bitmap applies to each of the multiple carriers in the carrier group.

In certain related embodiments, the correspondence information indicates that all carriers in the carrier group use the same codebook subset restriction.

In certain related embodiments, the correspondence information comprises first information associating the codebook subset restriction with one carrier in the carrier group, and second information indicating that at least one other carrier in the carrier group is to use the same codebook subset restriction as the one carrier. In some such embodiments, the one carrier is a primary carrier of the carrier group and the at least one other carrier is a non-primary carrier of the carrier group. In some other such embodiments, the second information comprises at least one multi-carrier codebook subset restriction confirmation bit.

In certain related embodiments, the correspondence information comprises at least one multi-carrier codebook subset restriction confirmation bit.

In yet another embodiment of the disclosed subject matter, a radio network node in a wireless communication system comprises a processor and memory configured to identify a codebook subset restriction to be applied to a UE employing carrier aggregation in MIMO communication, and identify a correspondence between the codebook subset restriction and multiple carriers in a carrier group of the UE. The radio network node further comprises a transmitter configured to transmit, from the radio network node to the UE, correspondence information indicating the correspondence between the codebook subset restriction and the multiple carriers in the carrier group.

In certain related embodiments, the radio network node further comprises transmitting, from the radio network node to the UE, codebook subset restriction information indicating the codebook subset restriction. In some such embodiments, the codebook subset restriction information comprises a codebook subset restriction bitmap, and the correspondence information indicates that the codebook subset restriction bitmap applies to each of the multiple carriers in the carrier group.

In certain related embodiments, the correspondence information indicates that all carriers in the carrier group use the same codebook subset restriction.

In certain related embodiments, the correspondence information comprises first information associating the codebook subset restriction with one carrier in the carrier group, and second information indicating that at least one other carrier in the carrier group is to use the same codebook subset restriction as the one carrier.

In still another embodiment of the disclosed subject matter, a wireless communication device employs carrier aggregation in MIMO communication and comprises a processor and memory configured to identifying a codebook subset restriction to be applied to multiple carriers in a carrier group of the wireless communication device, a receiver configured to receive, from a radio network node, correspondence information indicating a correspondence between the codebook subset restriction and the multiple carriers in the carrier group, and a transmitter configured to transmit channel state information for the multiple carriers according to the codebook subset restriction.

In certain related embodiments, the wireless communication device further comprises receiving, from the radio network node, codebook subset restriction information indicating the codebook subset restriction. In some such embodiments, the codebook subset restriction information comprises a codebook subset restriction bitmap, and the correspondence information indicates that the codebook subset restriction bitmap applies to each of the multiple carriers in the carrier group.

In still another embodiment of the disclosed subject matter, a method in a radio network node of a wireless communication system comprises identifying a configuration parameter to be applied to a UE employing carrier aggregation and MIMO, identifying a correspondence between the configuration parameter and multiple carriers in a carrier group of the UE, and transmitting, from the radio network node to the UE, correspondence information indicating the correspondence between the configuration parameter and the multiple carriers in the carrier group.

In certain related embodiments, the correspondence information indicates that all carriers in the carrier group use the same configuration parameter.

In certain related embodiments, the correspondence information comprises first information associating the configuration parameter with one carrier in the carrier group, and second information indicating that at least one other carrier in the carrier group is to use the same configuration parameter as the one carrier. In some such embodiments, the one carrier is a primary carrier of the carrier group and the at least one other carrier is a non-primary carrier of the carrier group.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
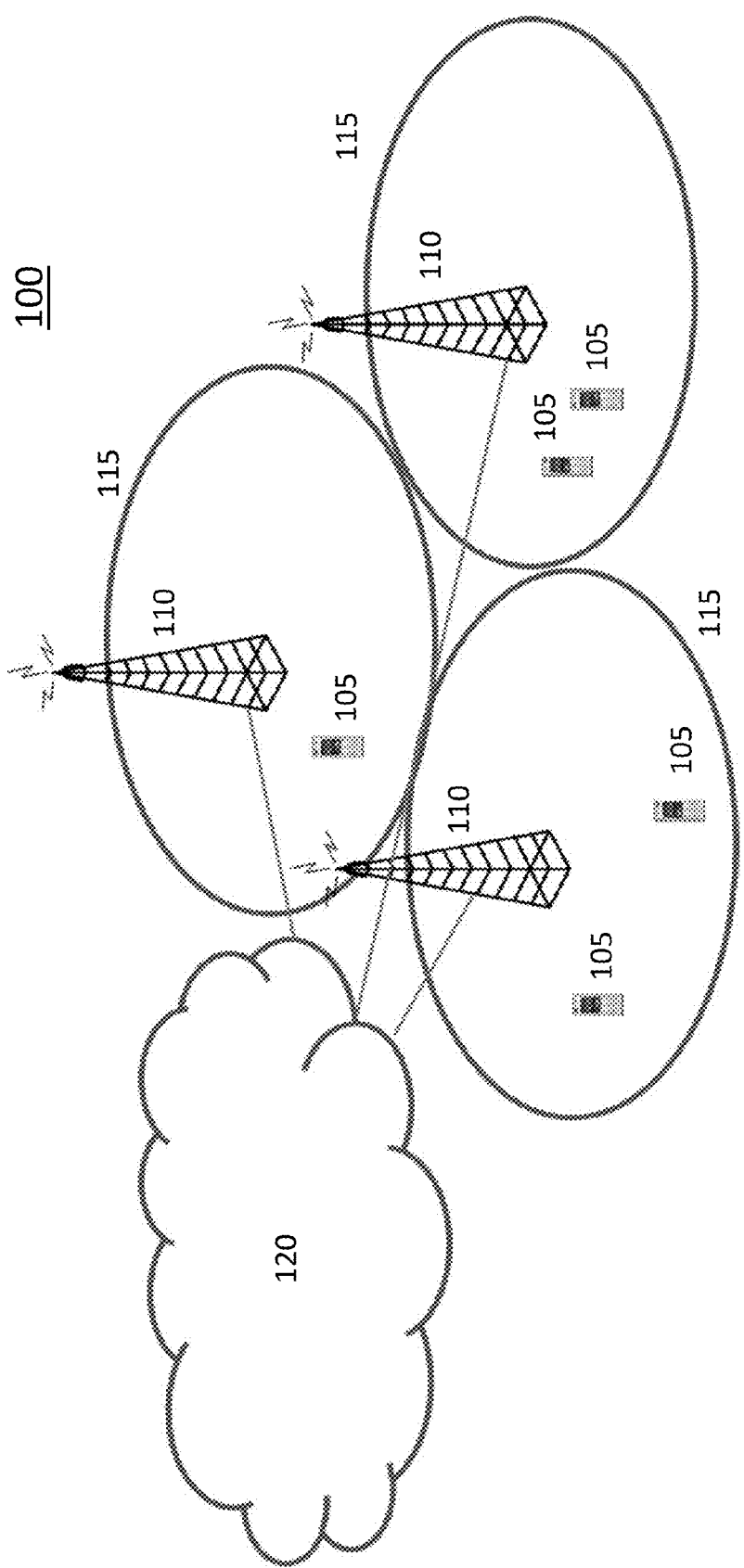
FIG. 1 is a diagram illustrating an LTE network.

The following description presents various embodiments of the disclosed subject matter. These embodiments are provided as teaching examples and are not to be construed as limiting the scope of the disclosed subject matter. For example, certain details of the described embodiments may be modified, omitted, or augmented without departing from the scope of the described subject matter.

In general, the disclosed subject matter provides methods and apparatuses in which a reduced amount of information is transmitted for certain higher layer signaling functions in multi-carrier multi-antenna wireless communication systems. The transmission of a reduced amount of information tends to decrease overall signaling overhead, which can improve various aspects of system performance.

In certain embodiments, a radio network node identifies a codebook subset restriction to be applied to a UE employing carrier aggregation and MIMO. The radio network node then identifies a correspondence between the codebook subset restriction and multiple carriers in a carrier group of the UE. In other words, the radio network node determines that the same codebook subset restriction can be applied to each of the multiple carriers. Thereafter, the radio network node transmits correspondence information to the UE indicating the correspondence between the codebook subset restriction and the multiple carriers in the carrier group. The UE, meanwhile, identifies the codebook subset restriction to be applied to the multiple carriers, receives the correspondence information, and transmits channel state information for the multiple carriers according to the codebook subset restriction. Thus, upon inspection of the correspondence information by the UE, the same codebook subset restriction may be applied to each of the multiple carriers and channel state information may be transmitted accordingly.

Because the correspondence information informs the UE that the same codebook subset restriction bitmap applies to each of the multiple carriers in the carrier group, the radio network node may avoid sending separate codebook subset restriction information for each carrier. For instance, rather than sending a separate codebook subset restriction bitmap for each carrier, the radio network node may send only one codebook subset restriction bitmap for an entire carrier group, and then provide a relatively small number of bits (e.g., one bit per carrier) as the correspondence information indicating that the same codebook subset restriction bitmap applies to all of the carriers.

The above and other embodiments may provide various benefits compared to conventional approaches. For example, in some systems they may reduce radio resource control (RRC) signaling overhead and improve the throughput of data traffic channel due to the lower overhead. They may also reduce RRC signaling message failures and latency and signaling over Iub and Iur interfaces.

Although several embodiments are described below with respect to codebook subset restriction, the described concepts could be applied to any suitable configuration parameter of communication systems employing carrier aggregation in MIMO communication.

The described embodiments may be implemented in any appropriate type of communication system supporting any suitable communication standards and using any suitable components. As one example, certain embodiments may be implemented in a Long Term Evolution (LTE) network, such as that illustrated in FIG. 1.

Referring to FIG. 1, a communication system 100 comprises a plurality of wireless communication devices 105 and a plurality of radio network nodes 110. The term "wireless communication device" may be used interchangeably with "UE" or "terminal", and examples of wireless communication devices and UEs include target devices, device to device (D2D) UEs, machine type UEs or UEs capable of machine to machine (M2M) communication, personal digital assistants (PDAs), iPADs, Tablet computers, mobile terminals, smart phones, laptop embedded equipped (LEE), laptop mounted equipment (LME), USB dongles etc.

In the example of FIG. 1, each of the radio network nodes takes the form of a base station (BS) or eNodeB (eNB). More generally, however, the term "radio network node" may refer to any of various additional types of equipment, such as, a NodeB, a multi-standard radio (MSR) node such as MSR BS, network controller, a radio network controller (RNC), a base station controller (BSC), relay, donor node controlling relay, base transceiver station (BTS), access point (AP), transmission points, transmission nodes, remote radio unit (RRU), remote radio head (RRH), nodes in distributed antenna system (DAS), among others.

Communication system 100 is organized into cells 115, which are connected to a core network 120 via corresponding to radio network nodes 110. Radio network nodes 110 are capable of communicating with wireless communication devices 105 along with any additional elements suitable to support communication between wireless communication devices or between a wireless communication device and another communication device, such as a landline telephone.

Figure 2:
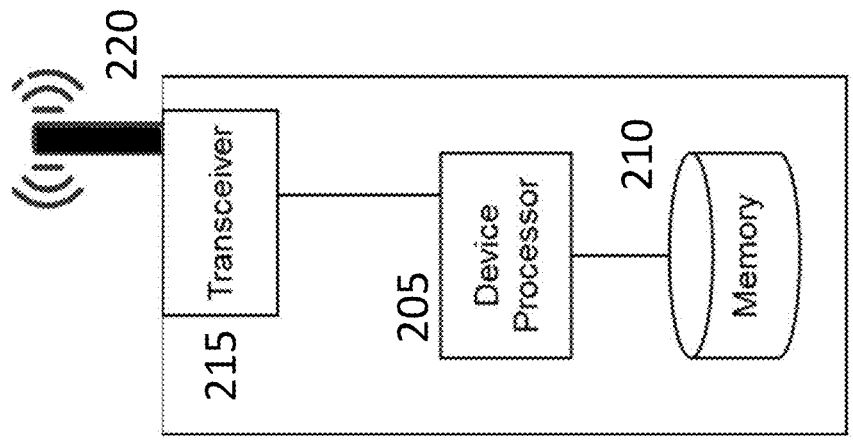
FIG. 2 is a diagram illustrating a wireless communication device.

Although wireless communication devices 105 may represent communication devices that include any suitable combination of hardware and/or software, these wireless communication devices may, in certain embodiments, represent devices such as an example wireless communication device illustrated in greater detail by FIG. 2. Similarly, although the illustrated radio network node may represent network nodes that include any suitable combination of hardware and/or software, these nodes may, in particular embodiments, represent devices such as the example radio network node illustrated in greater detail by FIG. 3.

Referring to FIG. 2, a wireless communication device 200 comprises a processor 205, a memory, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
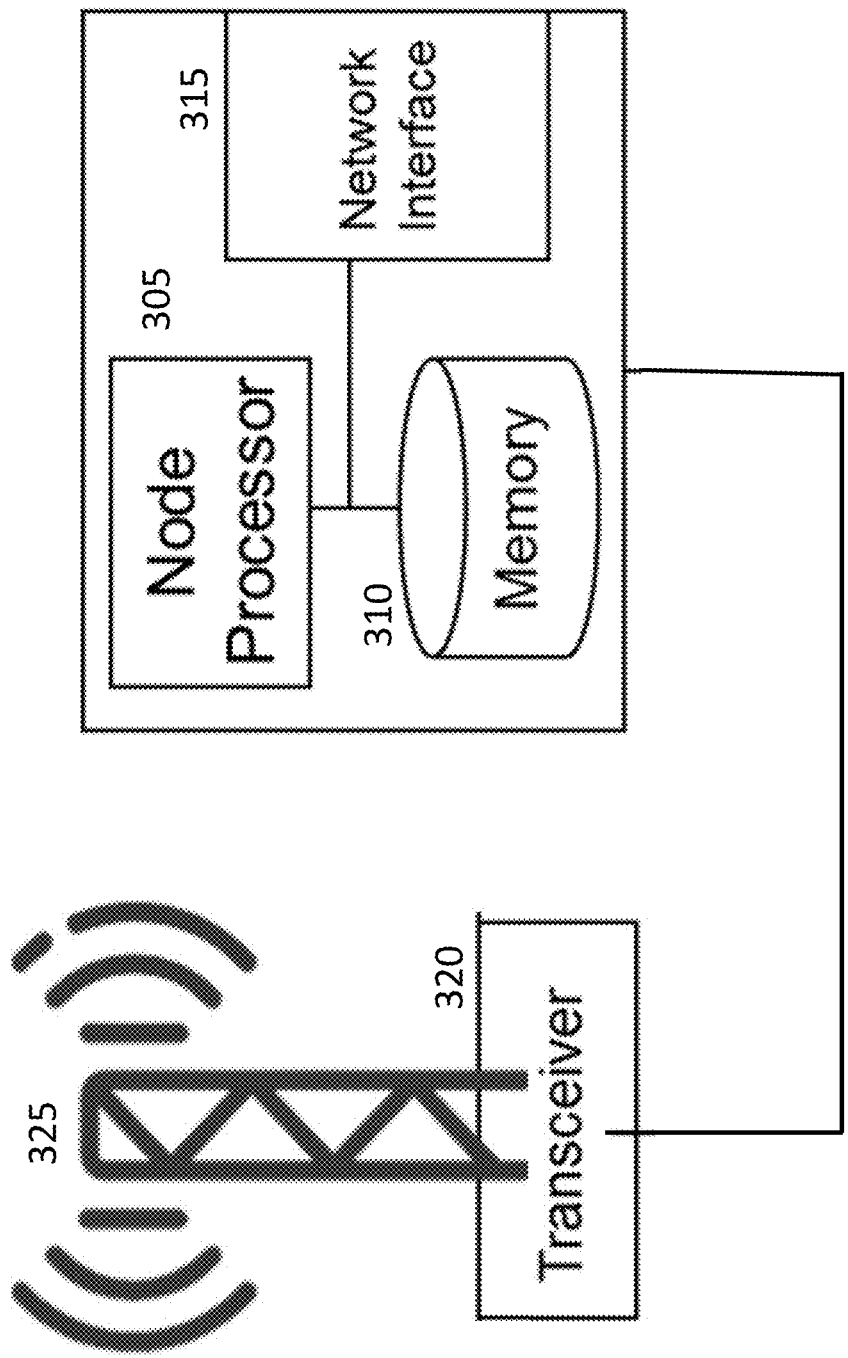
FIG. 3 is a diagram illustrating a radio network node.

Referring to FIG. 3, a radio network node 300 comprises a node processor 305, a memory 310, a network interface 315, a transceiver 320, and an antenna 325. In certain embodiments, some or all of the functionality described as being provided by a base station, a NodeB, an eNB, and/or any other type of network node may be provided by node processor 305 executing instructions stored on a computer-readable medium, such as memory 310 shown in FIG. 3. Alternative embodiments of radio network node 400 may comprise additional components to provide additional functionality, such as the functionality described herein and/or related supporting functionality.

In certain embodiments, a communication system may employ MIMO, which is an antenna technique intended to improve the spectral efficiency and thereby boost overall system capacity. MIMO typically uses a notation (M×N) to represent MIMO configuration in terms number of transmit antennas (M) and receive antennas (N). Some of the commonly used MIMO configurations currently standardized for various technologies are (2×1), (1×2), (2×2), (4×2), (4×4), (8×2), (8×4) and (8×8). The configurations represented by (2×1) and (1×2) are special cases of MIMO and they correspond to transmit diversity and receiver diversity respectively.

Multiple antennas employed at the transmitter and receiver can significantly increase system capacity. Transmission of independent symbol streams in the same frequency bandwidth, usually termed as spatial multiplexing (SM), achieves a linear increase in data rates with the increased number of antennas. On the other hand, by using space-time codes at the transmitter, reliability of the detected symbols can be improved by exploiting the so called transmit diversity. Both these schemes assume no channel knowledge at the transmitter. However, in practical wireless systems such as 3rd generation partnership project (3GPP) LTE, High-Speed Downlink Packet Access (HSDPA) and WiMAX systems, channel knowledge can be made available at the transmitter via feedback from the receiver to the transmitter. A MIMO transmitter can utilize this channel information to improve the system performance with the aid of precoding. In addition to beam forming gain, the use of precoding avoids the problem of ill-conditioned channel matrix.

In practice, complete channel state information (CSI) may be available for a communication system using a time division duplex (TDD) scheme by exploiting channel reciprocity. However, for a frequency division duplex (FDD) system, complete CSI is more difficult to obtain. In a FDD system, some kind of CSI knowledge may be available at the transmitter via feedback from the receiver. These systems are called limited feedback systems.

There are many implementations of limited feedback systems such as codebook based feedback, quantized channel feedback. 3GPP LTE, HSDPA and WiMax recommend codebook based feedback CSI for precoding. Examples of CSI are channel quality indicator (CQI), precoding index (PCI), precoding matrix indicator (PMI), rank indicator (RI). One or combination of different types of CSI is used by the network node (e.g. NodeB in UTRA or eNB in LTE) for one or more resource assignment related tasks such as scheduling data to UE, rank adaptation of MIMO streams, precoding selection for MIMO stream, etc.

In the description that follows, several embodiments are described with respect to MIMO operation in E-UTRA/LTE/LTE-A, UTRA/HSPA FDD systems. The described concepts, however, are applicable to any radio access technology (RAT) or multi-RAT system where the UE operates using MIMO. Examples of such systems include, e.g., LTE TDD, GSM/GERAN, Wi Fi, WLAN, WiMax, CDMA2000, LTE-NX, and Massive MIMO systems.

The described embodiments are applicable to single carrier as well as to MC or CA operation of the UE in conjunction with MIMO in which the UE is able to receive and/or transmit data to more than one serving cells using MIMO. The term "carrier aggregation" may be used interchangeably with "multi-carrier system", "multi-cell operation", "multi-carrier operation", or "multi-carrier" transmission and/or reception. Notably, depending on context (e.g., LTE vs. HSPA) the terms "carrier" and "cell" may be used interchangeably.

In the description that follows, certain concepts are described with reference to a four or five carrier system, but the described concepts are not limited to a specific number of carriers, and can be applied to $N_c$ carrier systems, where $N_c$ can be an arbitrary number of carriers, such as 32 carriers as in Release 13 LTE/LTE-A. Additionally, although the following description presents certain concepts in relation to downlink wireless transmissions, those concepts could also be applied to uplink wireless transmissions.

In various embodiments described below, a multicarrier UE uses the same precoding weight set restriction bitmap for all configured carriers, i.e., for all carriers in the same carrier group. In this case, for a multicarrier operation UE, instead of sending the bitmap to each carrier separately, an indication is sent to the UE to indicate whether or not to use the same bitmap for a secondary carrier as that of a primary carrier. It would be also possible for the network to indicate to the UE if bitmap of a third carrier is the same as the bitmap of the secondary or primary. The same idea is applied for four carrier operation and so on. So in general the bitmap of one carrier could be the same as all other multicarrier or a subset of carriers could have same bitmap.

Figure 4A:
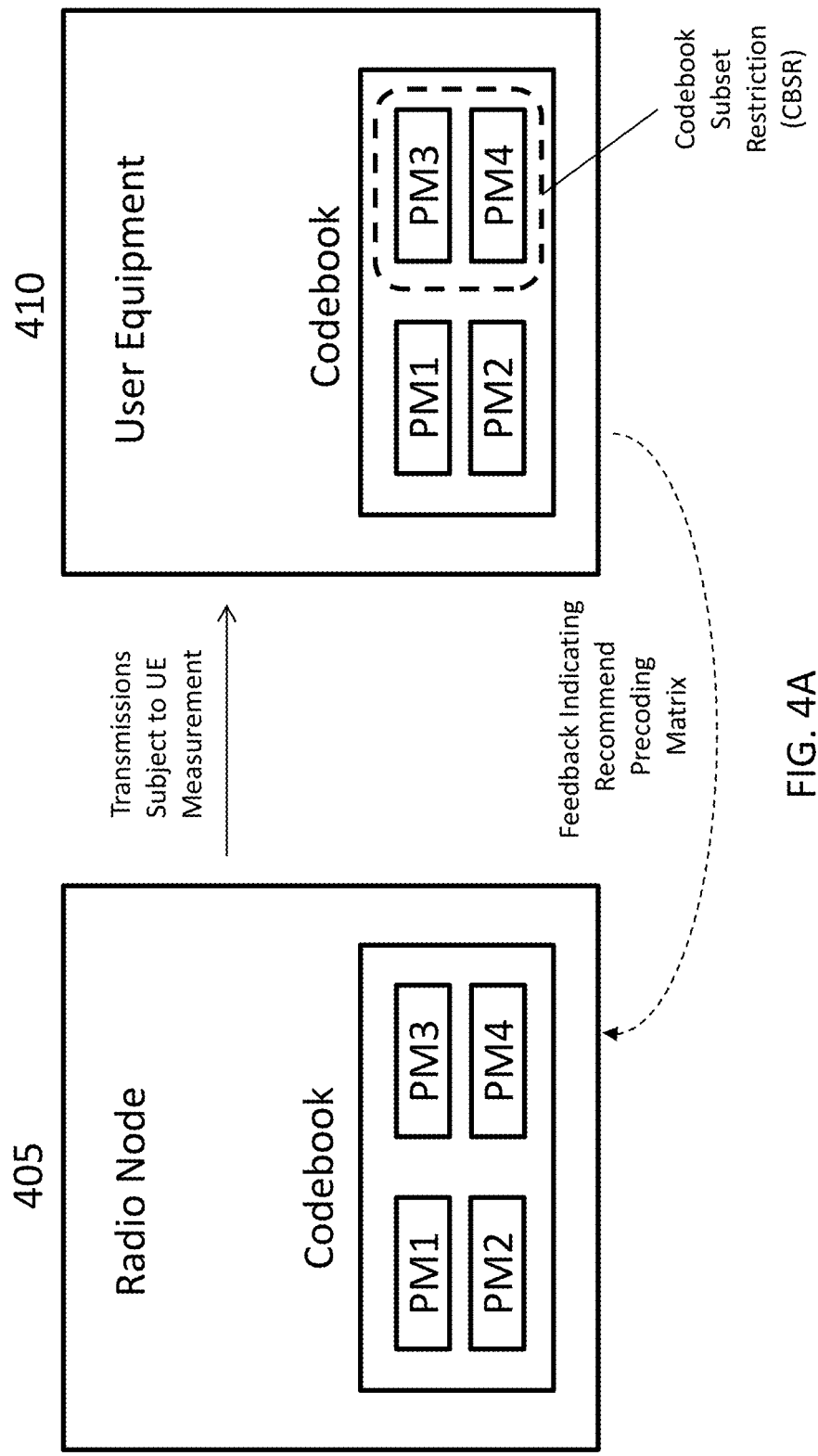
FIG. 4A is a diagram illustrating a wireless communication system that uses codebook based precoding in combination with carrier aggregation.
Figure 4B:
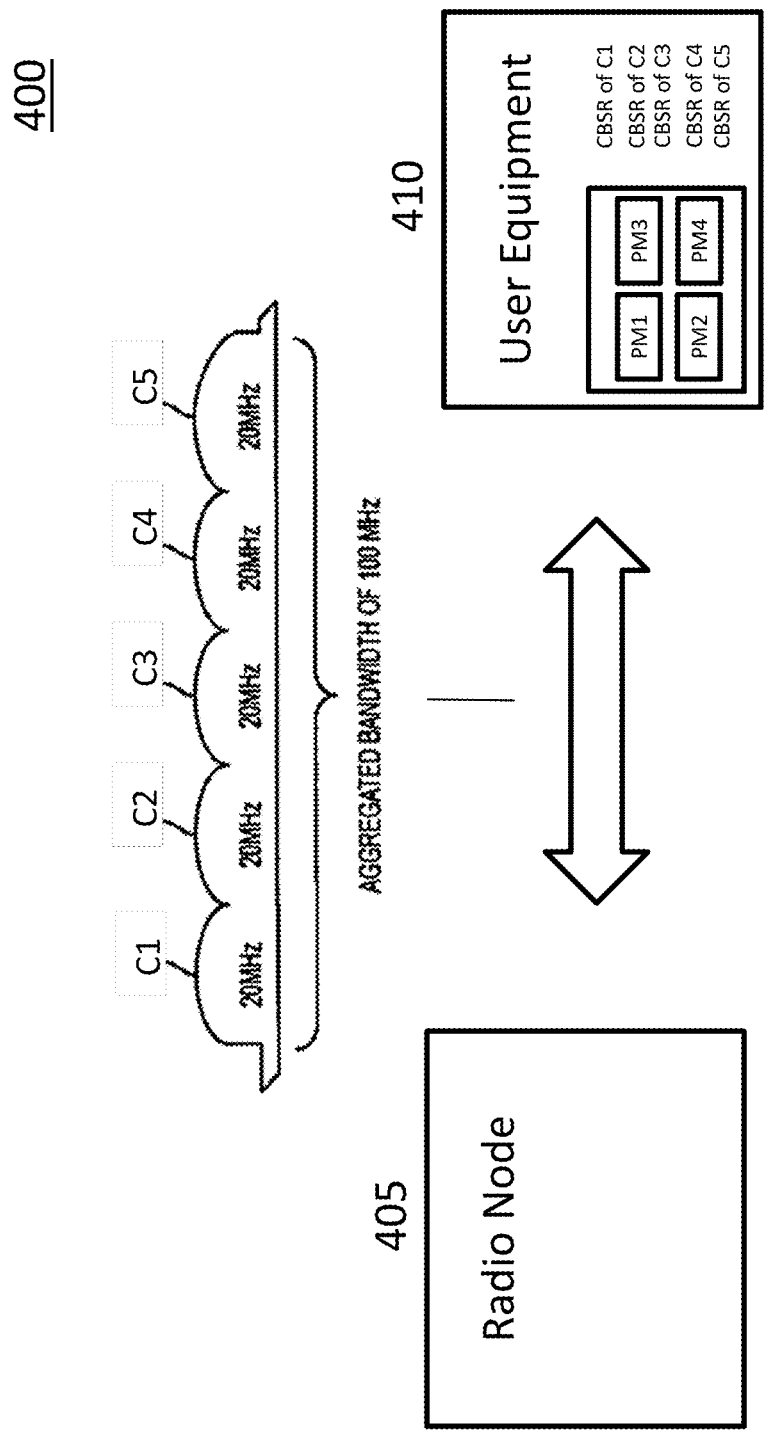
FIG. 4B is another diagram illustrating a wireless communication system that uses codebook based precoding in combination with carrier aggregation.
Figure 4C:
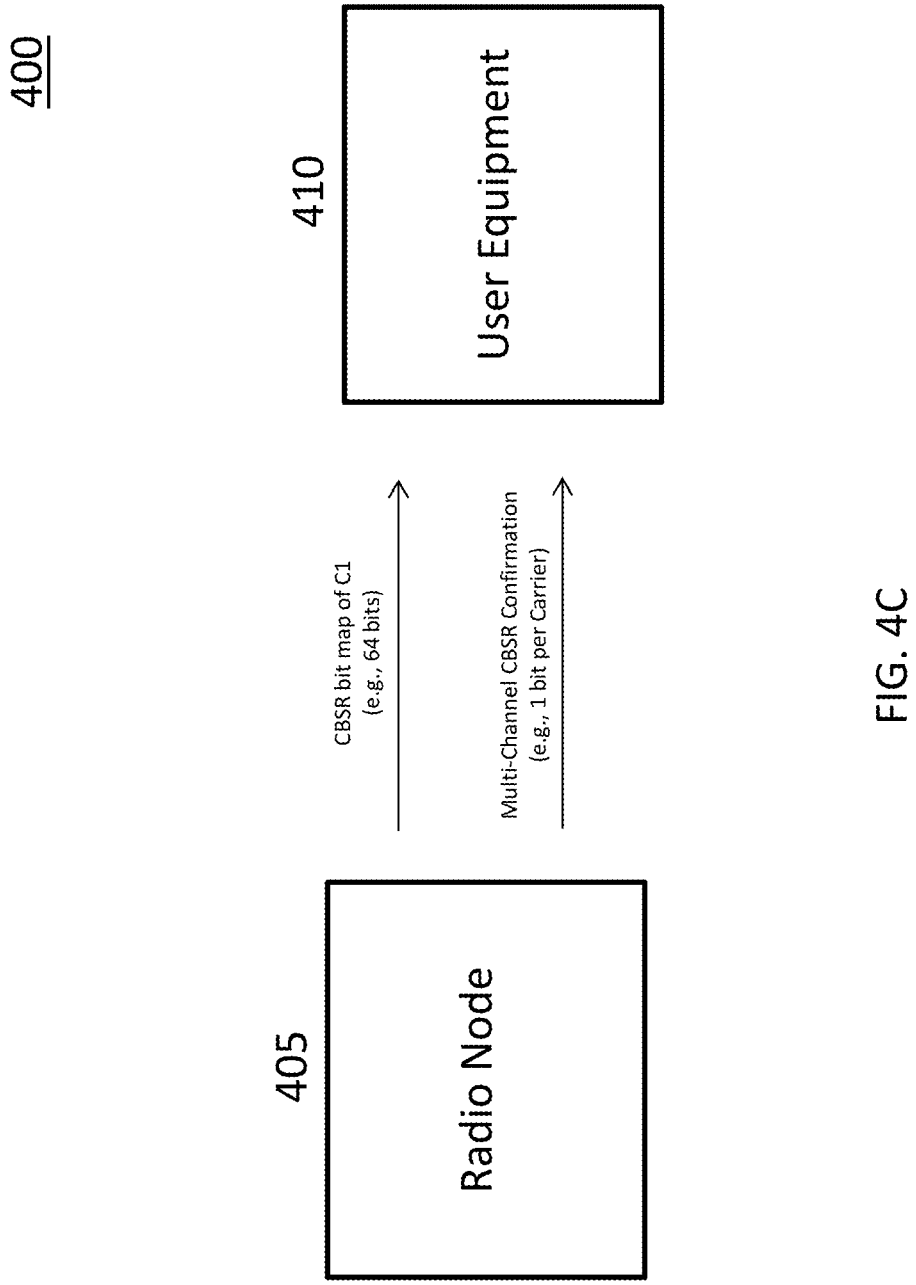
FIG. 4C is yet another diagram illustrating a wireless communication system that uses codebook based precoding in combination with carrier aggregation.

FIGS. 4A through 4C show an example wireless communication system 400 that uses codebook based precoding in combination with carrier aggregation. In FIGS. 4A through 4C, wireless communication system 400 comprises a radio network node 405 and UE 410.

As illustrated in FIG. 4A, in codebook based precoding, a predefined codebook is defined at both the transmitter and receiver. In the illustrated example, the codebook comprises entries in the form of precoding matrices PM1 through PM4. During typical operation of wireless communication system 400, UE 410 receives transmissions subject to some form or measurement or analysis, as illustrated in FIG. 4A by a solid arrow. Then, based on the measurement or analysis, UE 410 provides feedback indicating a recommended precoding matrix, as illustrated in FIG. 4A by a dotted arrow.

The entries of a codebook can be constructed using any of various alternative methods, e.g., Grassmannian, Lloyd algorithm, discrete Fourier Transform (DFT) matrix etc. A precoding matrix is often chosen to match the characteristics of the $N_R \times N_T$ MIMO channel matrix H, resulting in so-called channel dependent precoding. This is also commonly referred to as closed-loop precoding and strives for focusing the transmit energy into a subspace which is strong in the sense of conveying much of the transmitted energy to the UE. In addition, the precoding matrix may also be selected to orthogonalize a channel, meaning that after proper linear equalization at the UE, inter-layer interference is reduced. At the receiver it is common to find a signal-to-interference-and-noise ratio (SINR) with different codebook entries and choose a Rank/precoding index which yields a highest level of spectral efficiency or capacity.

A communication system can choose to use only a limited number of the available precoding elements for variety of reasons. This limitation—the codebook subset restriction (CBSR)—is then indicated to the UE. In the example of FIG. 4A, for instance, UE 410 is limited to recommending precoding matrix PM3 or precoding matrix PM4, as illustrated by a dotted box.

According to 3GPP standard TS 36.213/25.214, a UE is restricted to report PMI/PCI and rank indicator (RI)/number of transport blocks preferred (NTBP) (RI/NTBP) within a precoding codebook subset specified by a bitmap parameter codebookSubsetRestriction configured by higher layer signaling. For a specific precoding codebook and associated transmission mode, the bitmap can specify all possible precoding codebook subsets from which the UE should assume the eNB may be using when the UE is configured in the relevant transmission mode. Codebook subset restriction is supported for open-loop spatial multiplexing, closed-loop spatial multiplexing, multi-user MIMO and closed-loop Rank=1 precoding. A resulting number of bits for each transmission mode is shown in Table 1 below.

In the example of Table 1, the bitmap forms the bit sequence $a_{A_c-1}, \ldots, a_3, a_2, a_1, a_0$ where $a_0$ is a least significant bit (LSB) and $a_{A_c-1}$ is a most significant bit (MSB) and where a bit value of zero indicates that a precoding matrix index (PMI) and RI reporting is not allowed to correspond to precoding(s) associated with the bit. The associations of bits to precoding schemes for certain transmission modes are as follows.

TABLE 1

| | | Number of bits $A_c$ | |
|---|---|---|---|
| | | 2 antenna ports | 4 antenna ports |
| Transmission mode | Open-loop spatial multiplexing | 2 | 4 |
| | Closed-loop spatial multiplexing | 6 | 64 |
| | Multi-user MIMO | 4 | 16 |
| | Closed-loop rank = 1 precoding | 4 | 16 |

In High Speed Packet Access (HSPA), according to 3GPP standard TS 25.214, a UE is restricted to reporting a precoding control index (PCI), and number of transport blocks preferred (NTBP) within a precoding codebook subset specified by a bitmap parameter PrecodingWeightRestriction configured by higher layer signaling. The bitmap can specify all possible precoding codebook subsets from which the UE should assume the NodeB may be using when the UE is configured in any of the MIMO modes. The bitmap forms the bit sequence $a_{63}, \ldots, a_3, a_2, a_1, a_0$, where $a_0$ is the LSB and $a_{63}$ is the MSB and where a bit value of zero indicates that precoding index reporting is not allowed in the NTBP/PCI/CQI report.

Carrier aggregation (CA), also called multicarrier (MC), was introduced in Release 8 for HSPA and in Release 10 for LTE/LTE-A to increase the bandwidth without modifying the baseband. In CA or MC, multiple carriers are aggregated for concurrent transmission to a single terminal. Until Release 12, up to eight for HSPA and up to 5 for LTE/LTE-A component carriers, each of can be aggregated, allowing for transmission bandwidths up to 40 MHz for HSPA and up to 100 MHz for LTE/LTE-A. An example of CA using five component carriers C1 through C5 is shown in FIG. 4B. In the example of FIG. 4B, UE 410 includes a separate codebook subset restriction for each carrier.

In existing wireless systems, the network (e.g., eNB in LTE, NodeB/RNC in HSPA) sends a codebook subset restriction bitmap for each component carrier. For example, in the context of FIG. 4B, an existing system may send a separate bitmap for the codebook subset restriction (CBSR) of carrier C1, the CBSR or carrier C2, and so on. The network has an option to change a UE's bitmap through the higher layer signaling. For example, supposing the UE is configured with 4 transmit antennas and with 5 carriers, then the network needs to send 64*5=320 bits. This involves large payload, which can reduce data throughput. As an alternative approach, illustrated in FIG. 4C and described in further detail below, the network could send only one bitmap (e.g., a CBSR bitmap of carrier C1; alternatively, the network could send a reduced number of bitmaps), together with an indication that multiple carriers use the same bitmap (e.g., a Multi-Channel CBSR Confirmation). This alternative approach can significantly reduce the amount of information that must be transmitted from radio network node 405 to UE 410 in the event of a bitmap configuration/reconfiguration or update.

Figure 5:
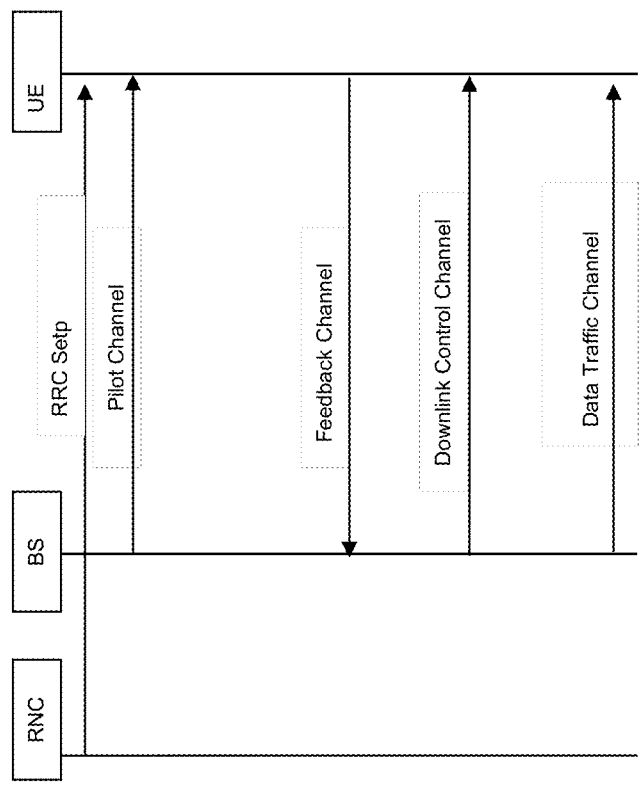
FIG. 5 is a diagram illustrating a message sequence used by each carrier in a multicarrier system.

FIG. 5 is a diagram illustrating a message sequence used by each carrier in a multicarrier system 500 according to an embodiment. For multicarrier operation an RNC 505 (or alternatively, a network—e.g., in LTE, both RNC and eNB are combined) sends information related to a codebook subset restriction to a UE 515 using RRC setup per carrier (S520). The RRC signaling can be part of any setup, confirm or reconfiguration message, e.g., radio bearer set up, active set update message, carrier update confirm, radio bearer reconfiguration, physical channel reconfiguration or transport channel reconfiguration.

Once the UE receives and decodes the information, the UE computes CSI from a pilot channel (reference signals) (S525). The computed CSI is sent back to a BS 510 using a feedback channel also called uplink feedback channel (S530). From this channel state information and based on other scheduler inputs, BS 510 sends a downlink control channel where the scheduling information is sent (S535). Once the UE decodes this downlink control channel, actual data transfer takes place between BS 510 and UE 515 (S540).

In some embodiments the network sends an information element (IE) by higher layer using RRC signaling indicating whether all carriers in the multicarrier aggregation will use the same codebook subset restriction bitmap as the primary carrier already indicated or configured for the primary carrier indicated by RRC signaling. This IE can be, for instance, a multicarrier CBSR confirmation bit.

The UE may decode the IE by determining if the multicarrier CBSR confirmation bit is set to a particular value (e.g., logical "1"). If so, then for instance in four carrier operation, the CBSR for a secondary carrier, a third carrier and a fourth carrier may be equal to the primary carrier. As a result, the secondary, third and fourth carriers will not report channel state parameters (e.g., CQI, PMI/PCI, RI/NTBP) using the precoding elements that are restricted by the codebook restriction bitmap. Note that precoding subset restriction bits are set in the primary carrier. In this case, only one bit is sent for each other carrier of the multicarrier aggregation instead of sending a complete bitmap (e.g., 64 bits) for each additional carrier.

The network may recognize, from RRC signaling, whether a multicarrier UE supports all the carriers in one band or in different bands. The UE may signal its capability to the network in a "UE radio access capability extension" IE. If, for example, the UE supports three carriers in one band, for instance, the UE may send reference "a1" in an "Additional Secondary carriers" IE. The same approach is applicable for more carriers; for example, where the UE supports seven carriers in one band, the UE may indicate reference "a5" which is included in "Additional Secondary carriers 2" IE. Therefore the network can recognize that all carriers are in one band and can set the same Codebook Subset Restriction to all carriers.

In another embodiment, the network sends an IE to the UE to indicate that the codebook subset restriction is the same for a set or a subset of carriers. Where the UE supports multicarriers in two bands, for example, the UE indicates to the network exact carrier/band combinations in a "UE radio access capability" IE. The network can indicate to the UE a specific codebook subset restriction for the carriers in each band. For example, in four carrier operation, the UE can indicate to the network that it supports 2 carriers in a band "A" and 2 carriers in a band "B". The network can indicate to the UE that a codebook subset restriction for a secondary carrier is equal to codebook subset restriction for a primary carrier. This indication could be made in one bitmap, for example "000". Meanwhile, the network can indicate to the UE that a codebook subset restriction for the third carrier is equal to the codebook subset restriction for the fourth carrier. This indication could be made in one bitmap, for example "100". Examples of such bitmaps are illustrated in Table 2 below.

TABLE 2

| Option | bitmap | Indication clarification |
|---|---|---|
| 1 | 0000 | CBSR of C2 = CBSR of C1 |
| 2 | 0001 | CBSR of C3 = CBSR of C1 |
| 3 | 0010 | CBSR of C4 = CBSR of C1 |
| 4 | 0011 | CBSR of C3 = CBSR of C2 |
| 5 | 0100 | CBSR of C4 = CBSR of C3 |
| 6 | 0101 | CBSR of C4 = CBSR of C2 |
| 7 | 0110 | CBSR of C3 = CBSR of C2 = CBSR of C1 |
| 8 | 0111 | CBSR of C4 = CBSR of C3 = CBSR of C1 |
| 9 | 1000 | CBSR of C4 = CBSR of C3 = CBSR of C2 |
| 10 | 1001 | CBSR of C4 = CBSR of C2 = CBSR of C1 |

Note:
CBSR—codebook subset restriction, C1 = Primary carrier, C2 = Secondary carrier, C3 = Third carrier, C4 = Fourth carrier In this case, four bits can cover all possible options of bitmap signaling for four carrier operation. Consequently, for four carrier operation 4 bits×3 carriers=12 bits are used instead of sending complete 64 bits×3 carriers=192 bits for all 3 carriers. In systems using carrier aggregation with 8 or 32 carriers, an even greater reduction in signaling overhead could be achieved.

It is also possible to indicate that specific carriers or a set of carriers in one band have a common CBSR that is different from the codebook subset restriction of other set of carriers, even where all carriers are in the same band or are in one band but are non-contiguous.

In another embodiment, the network sends an IE with the "multicarrier CBSR confirmation bit" set to a predetermined value (e.g., logical "0") for a component carrier and sends a new codebook subset restriction bitmap. The UE receives and decodes the IE, determines that the multicarrier CBSR confirmation bit has the predetermined value, erases a previous codebook subset restriction bitmap, and sets the bitmap according to a new configuration. The channel state information parameters are reported according to the new bitmap it received by RRC signaling.

In another embodiment, the network sends a new codebook subset restriction without sending a multicarrier CBSR confirmation bit for a component carrier. Note that in these cases the network may send a bitmap which is different compared to that of a primary carrier.

In another embodiment, the network and the UE are configured such that if the network does not send either a multicarrier CBSR confirmation bit or a new codebook subset restriction bitmap for each component carrier, it is implicitly understood by the UE that it is to use a primary carrier configuration (bitmap).

Tables 3 and 4 below show alternative embodiments of an IE to be used in RRC signaling. The RRC signaling can be part of radio bearer set up, active set update message, carrier update confirm, radio bearer reconfiguration, physical channel reconfiguration or transport channel reconfiguration, for example. The IE, a multicarrier CBSR confirmation bit, is indicated to the UE for example as of type bit string (See Table 3). Another way of signaling could be that the multicarrier CBSR confirmation bit is set as Enumerated (TRUE).

If this IE is present, the UE can use the same CBSR for this carrier (e.g., secondary, third, fourth, fifth . . . eighth) as for the primary carrier. The absence of this IE indicates that the multicarrier CBSR confirmation bit is not used by the UE (See Table 4). Note that the multicarrier CBSR confirmation bit is set to "optional" so that it either the network can send this bit or not, so that it has an option to send a new bitmap.

Table 5 shows another alternative embodiment of an IE in which the multicarrier CBSR confirmation bitmap is indicated to the UE as of type bit string.

In the examples presented in Tables 3 through 5, it is assumed that the wireless communication system operates in secondary carrier MIMO mode with four transmit antennas parameters.

TABLE 3

| Information Element/Group name | Need | Multi | Type and reference | Semantics description | Version |
|---|---|---|---|---|---|
| CHOICE Configuration info | MP | | | | REL-11 |
| >Continue | | | (no data) | Used in reconfigurations without interruption of MIMO mode with four transmit | REL-11 |

TABLE 3-continued

| Information Element/Group name | Need | Multi | Type and reference | Semantics description | Version |
|---|---|---|---|---|---|
| | | | | antennas operation. | |
| >New configuration | | | | | REL-11 |
| >>MIMO mode with four transmit antennas N_cqi_typeA/M_cqi ratio | OP | | Enumerated (1/2, 2/3, 3/4, 4/5, 5/6, 6/7, 7/8, 8/9, 9/10, 1/1) | | REL-11 |
| >>MIMO mode with four transmit antennas pilot configuration | OP | | MIMO mode with four transmit antennas pilot configuration 10.3.6.143 | | REL-11 |
| >>Precoding weight set restriction | OP | | Bit string (64) | The first/leftmost bit contains the most significant bit, where a bit value of zero indicates that the precoding indices reporting is not allowed. | REL-11 |
| >>multicarrier codebook subset restriction confirmation bit | OP | | Bit string (1) | | REL-13 |

TABLE 4

| Information Element/Group name | Need | Multi | Type and reference | Semantics description | Version |
|---|---|---|---|---|---|
| CHOICE Configuration info | MP | | | | REL-11 |
| >Continue | | | (no data) | Used in reconfigurations without interruption of MIMO mode with four transmit antennas operation. | REL-11 |
| >New configuration | | | | | REL-11 |
| >>MIMO mode with four transmit antennas N_cqi_typeA/M_cqi ratio | OP | | Enumerated (1/2, 2/3, 3/4, 4/5, 5/6, 6/7, 7/8, 8/9, 9/10, 1/1) | | REL-11 |
| >>MIMO mode with four transmit antennas pilot configuration | OP | | MIMO mode with four transmit antennas pilot configuration 10.3.6.143 | | REL-11 |
| >>Precoding weight set restriction | OP | | Bit string (64) | The first/leftmost bit contains the most significant bit, where a bit value of zero indicates that the precoding indices reporting is not allowed. | REL-11 |
| >>multicarrier codebook subset restriction confirmation bit | OP | | Enumerated (TRUE) | If this IE present, the UE use the same codebook subset restriction for this carrier as for the primary carrier. The absence of this IE indicates that the multicarrier codebook subset restriction confirmation bit is not used by the UE. | REL-13 |

TABLE 5

| Information Element/Group name | Need | Multi | Type and reference | Semantics description | Version |
| --- | --- | --- | --- | --- | --- |
| CHOICE Configuration info | MP | | | | REL-11 |
| >Continue | | | (no data) | Used in reconfigurations without interruption of MIMO mode with four transmit antennas operation. | REL-11 |
| >New configuration | | | | | REL-11 |
| >>MIMO mode with four transmit antennas N_cqi_typeA/M_cqi ratio | OP | | Enumerated (1/2, 2/3, 3/4, 4/5, 5/6, 6/7, 7/8, 8/9, 9/10, 1/1) | | REL-11 |
| >>MIMO mode with four transmit antennas pilot configuration | OP | | MIMO mode with four transmit antennas pilot configuration 10.3.6.143 | | REL-11 |
| >>Precoding weight set restriction | OP | | Bit string (64) | The first/leftmost bit contains the most significant bit, where a bit value of zero indicates that the precoding indices reporting is not allowed. | REL-11 |
| >>multicarrier codebook subset restriction confirmation bit | OP | | Bit string (8) | | REL-13 |

Figure 6:
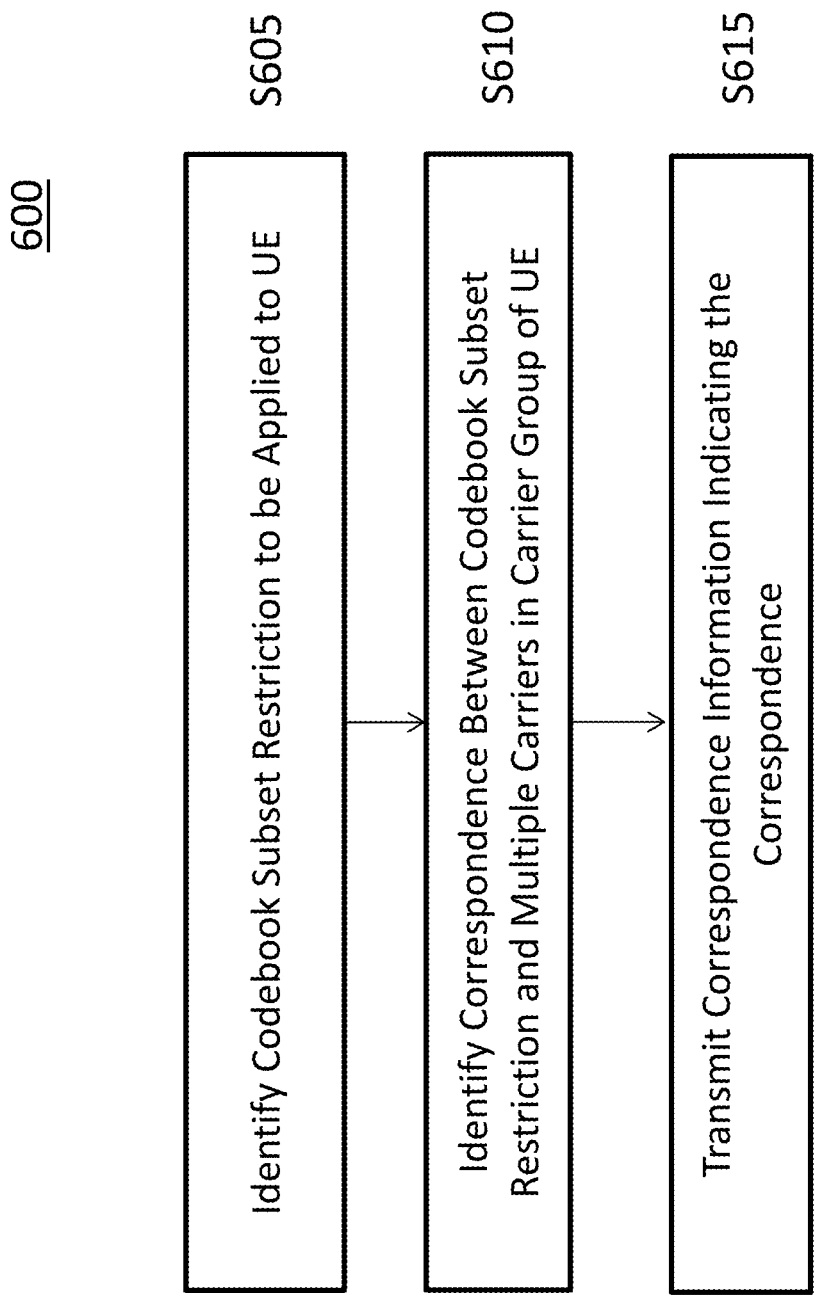
FIG. 6 is a flowchart illustrating a method in a radio network node of a wireless communication system.

FIG. 6 is a flowchart illustrating a method in a radio network node of a wireless communication system, according to an embodiment.

Referring to FIG. 6, the method comprises identifying a codebook subset restriction to be applied to a UE employing carrier aggregation in MIMO communication (S605), identifying a correspondence between the codebook subset restriction and multiple carriers in a carrier group of the UE (S610), and transmitting, from the radio network node to the UE, correspondence information indicating the correspondence between the codebook subset restriction and the multiple carriers in the carrier group (S615).

In certain embodiments, the method further comprises transmitting, from the radio network node to the UE, codebook subset restriction information indicating the codebook subset restriction. In such embodiments the codebook subset restriction information may comprise a codebook subset restriction bitmap, and the correspondence information may indicate that the codebook subset restriction bitmap applies to each of the multiple carriers in the carrier group.

In certain embodiments, the correspondence information indicates that all carriers in the carrier group use the same codebook subset restriction. For instance, the correspondence information may comprise first information associating the codebook subset restriction with one carrier in the carrier group, and second information indicating that at least one other carrier in the carrier group is to use the same codebook subset restriction as the one carrier. In some such embodiments, the one carrier is a primary carrier of the carrier group and the at least one other carrier is a non-primary carrier of the carrier group. Also in some such embodiments, the second information may comprise at least one multi-carrier codebook subset restriction confirmation bit.

In certain embodiments, the method further comprises determining whether all carriers of the carrier group reside in a single frequency band, and selectively applying the same codebook subset restriction to all or only some of the carriers according to the determination.

In certain embodiments, the method further comprises identifying at least one additional codebook subset restriction to be applied to the UE, identifying an additional correspondence between the at least one additional codebook subset restriction and multiple other carriers in the carrier group, and transmitting, from the radio network node to the UE, additional correspondence information indicating the additional correspondence. In some such embodiments, some of the multiple carriers are disposed in one frequency band and the multiple other carriers are disposed in at least one other frequency band separate from the one frequency band. Moreover, in some such embodiments the correspondence information and the additional correspondence information each comprise at least one band-specific multi-carrier codebook subset restriction confirmation bit.

Additionally, such embodiments may still further comprise receiving, from the UE, an indication of carrier/band combinations for the first and second frequency bands, and transmitting the correspondence information and the additional correspondence information in response to receiving the indication of the carrier/band combinations.

In certain embodiments, the method further comprises transmitting, from the radio network node to the UE, nullification information to nullify a prior codebook subset restriction for one or more of the multiple carriers, wherein transmission of the correspondence nullification information causes a new codebook subset restriction to be applied to the multiple carriers. Alternatively, the nullification information could indicate that no codebook subset restriction should be applied to the one or more of the multiple carriers.

In certain embodiments, transmission of the correspondence information causes a current codebook subset restriction of the UE to be replaced by a new codebook subset restriction.

Figure 7:
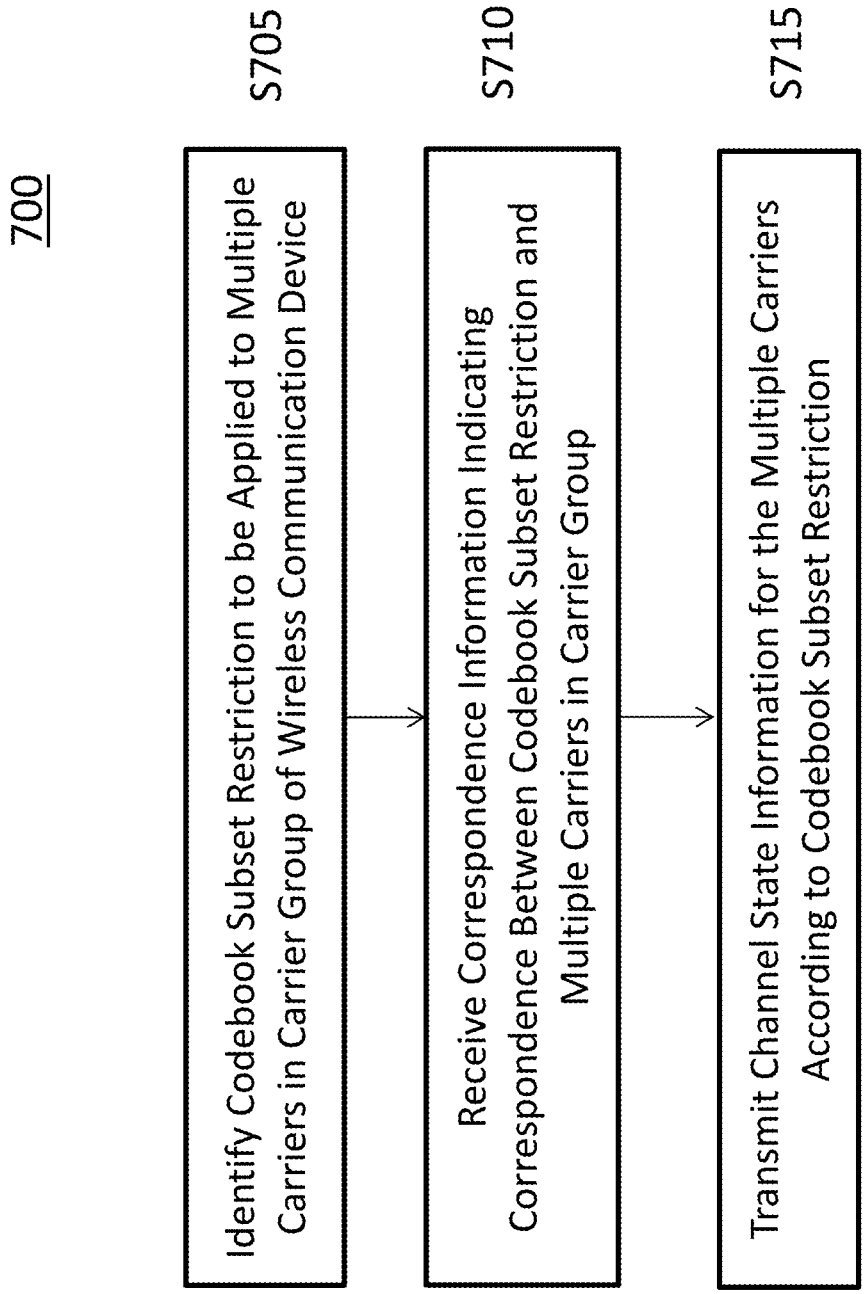
FIG. 7 is a flowchart illustrating a method in a wireless communication device employing carrier aggregation in MIMO communication.

FIG. 7 is a flowchart illustrating a method in a wireless communication device employing carrier aggregation in MIMO communication, according to an embodiment. The method comprises identifying a codebook subset restriction to be applied to multiple carriers in a carrier group of the wireless communication device (S705), receiving, from a radio network node, correspondence information indicating a correspondence between the codebook subset restriction and the multiple carriers in the carrier group (S710), and transmitting channel state information for the multiple carriers according to the codebook subset restriction (S715).

The method of FIG. 7 could be performed by the wireless communication device in combination with a radio network node performing the method of FIG. 6. Under those circumstances, the method of FIG. 7 could also include various additional features complementary to the additional features described in conjunction with the method of FIG. 6.

Figure 8:
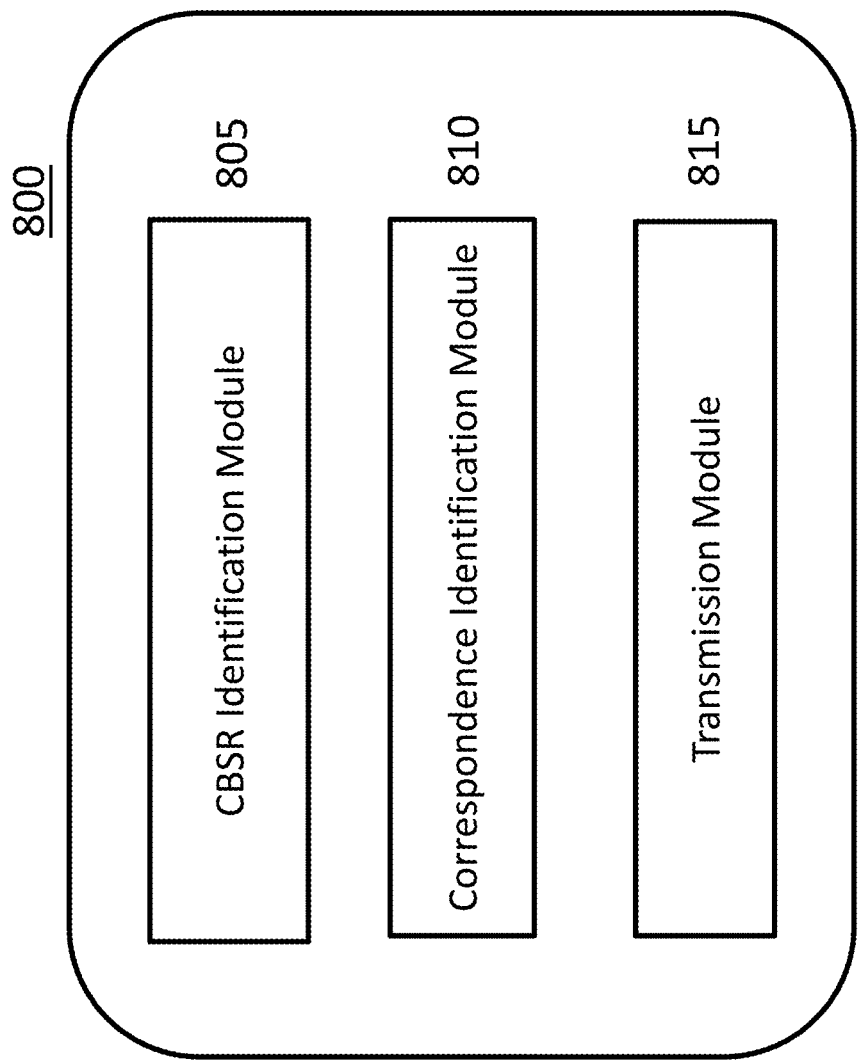
FIG. 8 is a diagram illustrating an apparatus configured to perform a method such as that illustrated in FIG. 6.

FIG. 8 is a diagram illustrating an apparatus 800 configured to perform a method such as that illustrated in FIG. 6.

Referring to FIG. 8, apparatus 800 comprises a CBSR identification module 805 configured to identify a codebook subset restriction to be applied to a UE employing carrier aggregation in MIMO communication, a correspondence identification module 810 configured to identify a correspondence between the codebook subset restriction and multiple carriers in a carrier group of the UE, and a transmission module 815 configured to transmit, from the radio network node to the UE, correspondence information indicating the correspondence between the codebook subset restriction and the multiple carriers in the carrier group. Moreover, the illustrated modules could be modified and/or combined with other modules to implement various additional features such as those described in relation to FIG. 6.

Figure 9:
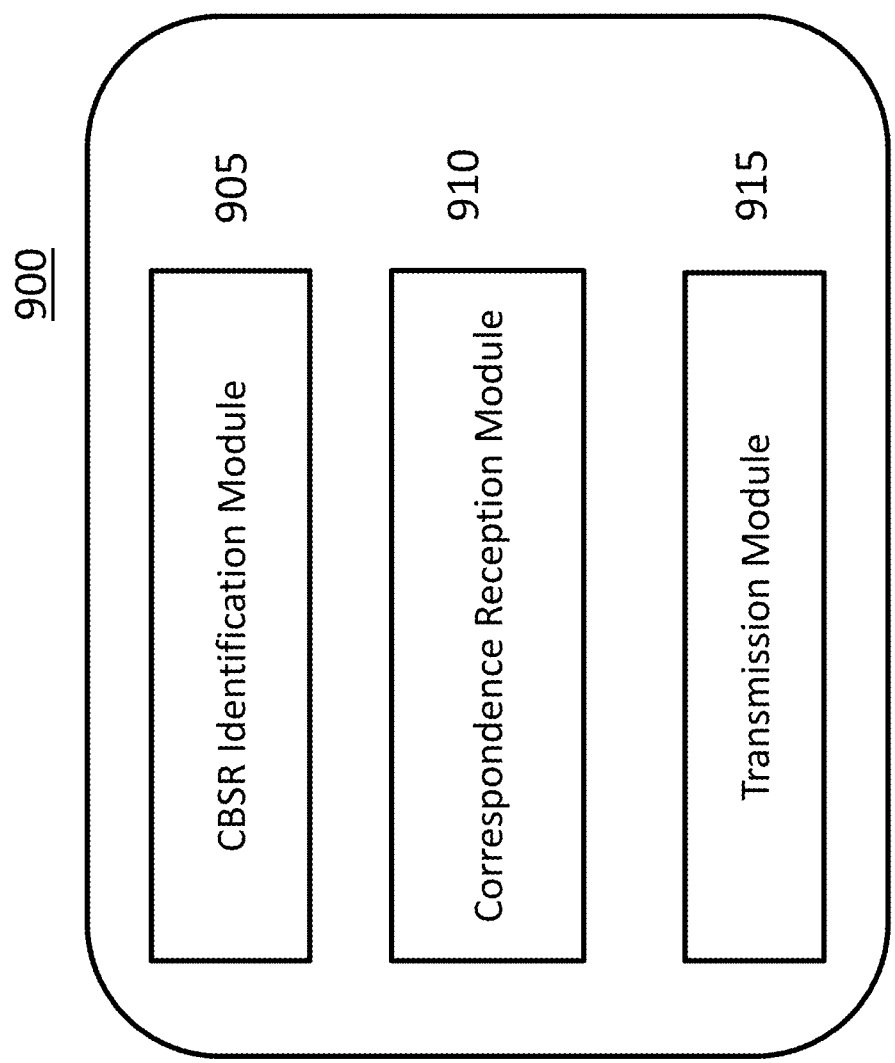
FIG. 9 is a diagram illustrating an apparatus configured to perform a method such as that illustrated in FIG. 7.

FIG. 9 is a diagram illustrating an apparatus 900 configured to perform a method such as that illustrated in FIG. 7.

Referring to FIG. 9, apparatus 900 comprises a CBSR identification module 905 configured to identify a codebook subset restriction to be applied to multiple carriers in a carrier group of the wireless communication device, a correspondence reception module 910 configured to receive, from a radio network node, correspondence information indicating a correspondence between the codebook subset restriction and the multiple carriers in the carrier group, and a transmission module 915 configured to transmit channel state information for the multiple carriers according to the codebook subset restriction. Moreover, the illustrated modules could be modified and/or combined with other modules to implement various additional features such as those described in relation to FIG. 7.

While the disclosed subject matter has been presented above with reference to various embodiments, it will be understood that various changes in form and details may be made to the described embodiments without departing from the overall scope of the invention.

The invention claimed is:

1. A method in a radio network node of a wireless communication system, comprising:
   identifying a codebook subset restriction to be applied to a user equipment (UE) employing carrier aggregation in multiple-input-multiple-output (MIMO) communication;
   identifying a correspondence between the codebook subset restriction and multiple carriers in a carrier group of the UE; and
   transmitting, from the radio network node to the UE, correspondence information indicating the correspondence between the codebook subset restriction and the multiple carriers in the carrier group,
   wherein the correspondence information comprises first information associating the codebook subset restriction with one carrier in the carrier group, and second information indicating that at least one other carrier in the carrier group is to use the same codebook subset restriction as the one carrier.

2. The method of claim 1, further comprising transmitting, from the radio network node to the UE, codebook subset restriction information indicating the codebook subset restriction.

3. The method of claim 2, wherein the codebook subset restriction information comprises a codebook subset restriction bitmap.

4. The method of claim 1, wherein the one carrier is a primary carrier of the carrier group and the at least one other carrier is a non-primary carrier of the carrier group.

5. The method of claim 1, wherein the second information comprises at least one multi-carrier codebook subset restriction confirmation bit.

6. The method of claim 1, wherein the correspondence information comprises at least one multi-carrier codebook subset restriction confirmation bit.

7. The method of claim 1, further comprising determining whether all carriers of the carrier group reside in a single frequency band, and selectively applying the same codebook subset restriction to all or only some of the carriers according to the determination.

8. The method of claim 1, further comprising:
   identifying at least one additional codebook subset restriction to be applied to the UE;
   identifying an additional correspondence between the at least one additional codebook subset restriction and multiple other carriers in the carrier group; and
   transmitting, from the radio network node to the UE, additional correspondence information indicating the additional correspondence.

9. The method of claim 8, wherein the multiple carriers are disposed in one frequency band and the multiple other carriers are disposed in at least one other frequency band separate from the one frequency band.

10. The method of claim 9, wherein the correspondence information and the additional correspondence information each comprise at least one band-specific multi-carrier codebook subset restriction confirmation bit.

11. The method of claim 9, further comprising receiving, from the UE, an indication of carrier/band combinations for the first and second frequency bands, and transmitting the correspondence information and the additional correspondence information in response to receiving the indication of the carrier/band combinations.

12. The method of claim 1, further comprising transmitting, from the radio network node to the UE, nullification information to nullify a prior codebook subset restriction for one or more of the multiple carriers, wherein transmission of the correspondence information causes a new codebook subset restriction to be applied to one or more of the multiple carriers, or causes no codebook subset restriction to be applied to the one or more of the multiple carriers.

13. The method of claim 1, wherein transmission of the correspondence information causes a current codebook subset restriction of the UE to be replaced by a new codebook subset restriction.

14. A method in a wireless communication device employing carrier aggregation in multiple-input-multiple-output (MIMO) communication, comprising:
 identifying a codebook subset restriction to be applied to multiple carriers in a carrier group of the wireless communication device;
 receiving, from a radio network node, correspondence information indicating a correspondence between the codebook subset restriction and the multiple carriers in the carrier group; and
 transmitting channel state information for the multiple carriers according to the codebook subset restriction,
 wherein the correspondence information comprises first information associating the codebook subset restriction with one carrier in the carrier group, and second information indicating that at least one other carrier in the carrier group is to use the same codebook subset restriction as the one carrier.

15. The method of claim 14, further comprising receiving, from the radio network node, codebook subset restriction information indicating the codebook subset restriction.

16. The method of claim 15, wherein the codebook subset restriction information comprises a codebook subset restriction bitmap.

17. The method of claim 14, wherein the one carrier is a primary carrier of the carrier group and the at least one other carrier is a non-primary carrier of the carrier group.

18. The method of claim 14, wherein the second information comprises at least one multi-carrier codebook subset restriction confirmation bit.

19. The method of claim 14, wherein the correspondence information comprises at least one multi-carrier codebook subset restriction confirmation bit.

20. A radio network node in a wireless communication system, comprising:
 a processor and memory configured to:
  identify a codebook subset restriction to be applied to a user equipment (UE) employing carrier aggregation in multiple-input-multiple-output (MIMO) communication; and
  identify a correspondence between the codebook subset restriction and multiple carriers in a carrier group of the UE; and
 a transmitter configured to transmit, from the radio network node to the UE, correspondence information indicating the correspondence between the codebook subset restriction and the multiple carriers in the carrier group,
 wherein the correspondence information comprises first information associating the codebook subset restriction with one carrier in the carrier group, and second information indicating that at least one other carrier in the carrier group is to use the same codebook subset restriction as the one carrier.

21. The radio network node of claim 20, further comprising transmitting, from the radio network node to the UE, codebook subset restriction information indicating the codebook subset restriction.

22. The radio network node of claim 21, wherein the codebook subset restriction information comprises a codebook subset restriction bitmap.

23. A wireless communication device employing carrier aggregation in multiple-input-multiple-output (MIMO) communication and comprising:
 a processor and memory configured to identify a codebook subset restriction to be applied to multiple carriers in a carrier group of the wireless communication device;
 a receiver configured to receive, from a radio network node, correspondence information indicating a correspondence between the codebook subset restriction and the multiple carriers in the carrier group; and
 a transmitter configured to transmit channel state information for the multiple carriers according to the codebook subset restriction,
 wherein the correspondence information comprises first information associating the codebook subset restriction with one carrier in the carrier group, and second information indicating that at least one other carrier in the carrier group is to use the same codebook subset restriction as the one carrier.

24. The wireless communication device of claim 23, further comprising receiving, from the radio network node, codebook subset restriction information indicating the codebook subset restriction.

25. The wireless communication device of claim 24, wherein the codebook subset restriction information comprises a codebook subset restriction bitmap.

26. A method in a radio network node of a wireless communication system, comprising:
 identifying a configuration parameter to be applied to a user equipment (UE) employing carrier aggregation and multiple-input-multiple-output (MIMO);
 identifying a correspondence between the configuration parameter and multiple carriers in a carrier group of the UE; and
 transmitting, from the radio network node to the UE, correspondence information indicating the correspondence between the configuration parameter and the multiple carriers in the carrier group,
 wherein the correspondence information comprises first information associating the configuration parameter with one carrier in the carrier group, and second information indicating that at least one other carrier in the carrier group is to use the same configuration parameter as the one carrier.

27. The method of claim 26, wherein the one carrier is a primary carrier of the carrier group and the at least one other carrier is a non-primary carrier of the carrier group.

* * * * *